United States Patent [19]

Kreighbaum et al.

[11] 3,903,161

[45] Sept. 2, 1975

[54] KETOAMIDES

[75] Inventors: William E. Kreighbaum; William Timmey Comer, both of Evansville, Ind.

[73] Assignee: Mead Johnson & Company, Evansville, Ind.

[22] Filed: Nov. 23, 1973

[21] Appl. No.: 418,715

[52] U.S. Cl. .............................. 260/559 R; 260/289
[51] Int. Cl.² ...................................... C07C 103/32
[58] Field of Search .................... 260/559 R, 558 R

[56] References Cited
FOREIGN PATENTS OR APPLICATIONS
278,698  8/1970  U.S.S.R.

Primary Examiner—C. Davis
Attorney, Agent, or Firm—Robert E. Carnahan; Robert H. Uloth

[57] ABSTRACT

The present invention concerns a group of ketoamides which have biological activity. Certain of these ketoamides are useful as intermediates for the preparation of 1-substituted 3(2H)-isoquinolones in high yield by cyclization of the ketoamide under acidic conditions. The isoquinolones are peripheral vasodilators and hypotensive agents.

9 Claims, No Drawings

KETOAMIDES

FIELD OF THE INVENTION

The present invention deals with the chemistry of carbon compounds which are carbocyclic amides in the carboxylic acid series. More particularly, they are substituted phenylacetamides having a substituted phenylacetyl group in the 2 position.

DESCRIPTION OF THE PRIOR ART

The chemical literature most closely related to the present invention is involved with the synthesis of papaverine analogs. Representative of this literature is an article co-authored by the present inventors which appeared in Journal of Medicinal Chemistry, 15, 1131 (1972), and their co-pending patent application Ser. No. 184,197 filed Sept. 27, 1971, and now U.S. Pat. No. 3,798,225, patented Mar. 19, 1974. Similar syntheses have been described by Dorofeenko, et al., in J. Gen. Chem., USSR, 40(1): 230 (1970) and by I. W. Elliott, Jr., in J. Heterocyclic Chem., 7, 1229 (1970) who prepared 1-substituted-3(2H)-isoquinolones by the reaction of substituted 2-(phenylacetyl)phenylacetic acids with ammonium acetate or primary amines. Neither of these authors conceived of substituted 2-(phenylacetyl)phenylacetamides in connection with their work. Earlier Bently, et al., J. Chem. Soc., 1952, 1763 envisioned the preparation of papaverine from 4,5-dimethoxy-2-(3,4-dimethoxyphenylacetyl)-phenylacetamide which was to be prepared from methyl 4,5-dimethoxy-2-(3,4-dimethoxyphenylacetyl)-phenylacetate by reaction with aqueous ammonia, but a 1,4-naphthoquinone unexpectedly resulted. 2-Acylphenylacetamides have been projected as intermediates in the preparation of substituted 1-methyl- and 1-ethyl-3(2H)-isoquinolones by the reaction of ammonium hydroxide with 3-acylaminobenzopyrylium salts (Dorofeenko, et al., Khim Geterotsiklich Soedin 1971(6), 730-2; Current Abstracts of Chemistry, Vol. 43 issued 4-14-(1971), Abstract No. 182646).

SUMMARY OF THE INVENTION

The present invention is concerned with substances having Formulas I or II

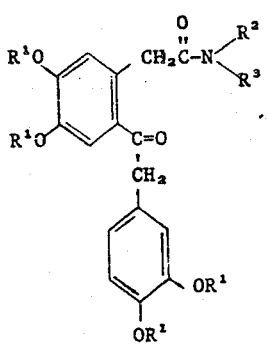

Formula I

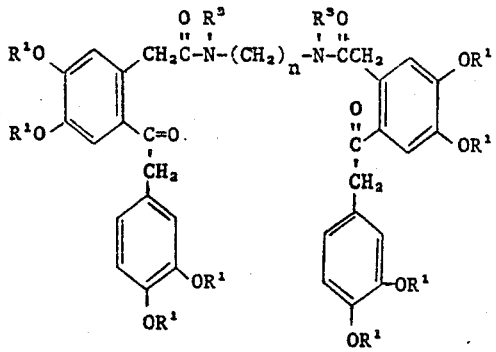

Formula II wherein $R^1$ is lower alkyl having from 1 to 4 carbon atoms, $R^2$ is selected from the group consisting of lower alkyl having from 2 to 4 carbon atoms, alkenyl having from 3 to 6 carbon atoms, cycloalkyl having from 3 to 6 carbon atoms, phenyl, phenylalkyl having up to 10 carbon atoms, substituted phenyl, and substituted phenylalkyl having up to 10 carbon atoms apart from the substituent. The substituent of the substituted phenyl and substituted phenylalkyl groups is in the 2, 3, 4, 5, or 6 ring positions and is halogen, lower alkyl having up to 4 carbon atoms, methylenedioxy, or from 1 to 3 lower alkoxy groups having up to 4 carbon atoms each. $R^3$ is selected from the group consisting of hydrogen and lower alkyl having from 1 to 4 carbon atoms, and $n$ is an interger of from 2 to 6.

The lower alkyl and lower alkoxy groups referred to in the foregoing definitions may be straight or branched chain and include methyl (excepting $R^2$), ethyl, propyl, isopropyl, butyl, sec.-butyl, tert.-butyl, methoxy, ethoxy, isopropoxy, etc. The halogens include fluorine, chlorine, bromine, and iodine.

The substances of Formula I and Formula II may be prepared by the conventional mixed anhydride synthesis for amides involving the reaction of the corresponding carboxylic acid with the primary or secondary amine according to the method of L. A. Branda, et al. J. Med. Chem., 9, 169 (1966). They are preferably prepared from the isochromanone of Formula V by reaction thereof with at least an equimolar amount of the appropriate primary or secondary amine in an anhydrous organic solvent. The preferred solvent is tetrahydrofuran, but other solvents such as di-n-butyl ether, diethyl ether, dioxane, tetrahydropyran, benzene, toluene, carbon tetrachloride, acetonitrile, ethylene dichloride, etc. The only requirements are that the isochromanone reactant be soluble in the solvent and that solvent be inert to reaction therewith or with the amine reaction under the reaction conditions. The reaction is preferably carried out at room temperature but elevated temperatures up to about 100°C. may be employed in specific instances where this is found to give improved results.

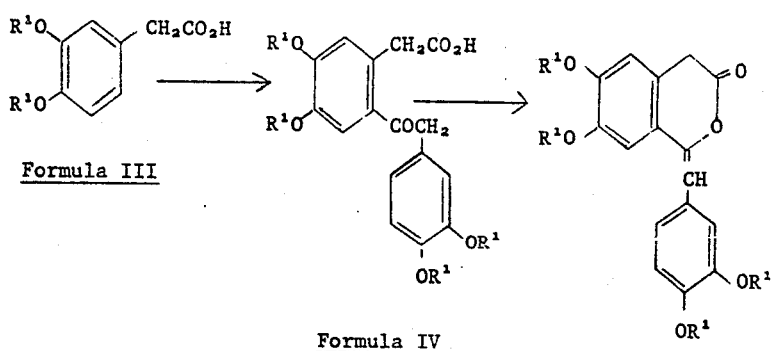

Formula III

Formula IV

Formula V

The isochromanone intermediates of Formula V are prepared as depicted in the foregoing reaction scheme. This is essentially the method described in the I. W. Elliott reference cited above. The first steps involves self-condensation of two molecular proportions of the phenylacetic acid of Formula III under the influence of polyphosphoric acid, and then cyclization of the resulting 2-acylphenylacetic acid of Formula IV under the influence of acetic acid and acetic anhydride.

The substances of Formula I and Formula II effect CNS depression on administration to mice orally or intraperitoneally in doses of at least 250 mg./kg. of body weight. They are relatively non-toxic having approximate Ld$_{50}$ values of the order of 2000 mg./kg. in mice administered orally. N,N-Diethyl-2-[2-[(3,4-dimethoxyphenyl)acetyl]-4,5-dimethoxyphenyl]acetamide exerts a depressor response on blood pressure and ileal relaxation in the dog on intravenous administration of a dose of 10 mg./kg. of body weight. 2-[2-[(3,4-Dimethoxyphenyl)acetyl]4,5-dimethoxyphenyl]-N-(4-methoxyphenyl)acetamide exhibits antiinflammatory activity in inhibiting edema of the rat foot caused by plantar injection of carrageenen. The foregoing biological effects may be demonstrated by conventional pharmacological tests.

The substances of Formula I in which $R^3$ is hydrogen are a particularly preferred sub-genus of the present invention since these substances are rapidly converted in substantially quantitative yield to biologically active isoquinolones on treatment with acid. The resulting isoquinolones are the subject of the above identified co-pending patent application of the present inventors, and are of interest because of their oral activity as hypotensive and peripheral vasodilating agents. The isoquinolones are illustrated by Formula VI in which $R^1$ and $R^2$ have the same meaning as above.

ethanolic hydrogen chloride will effect cyclization of even the most unreactive members of this sub-genus within 3 hours. Those in which the $R^2$ substituent is a relatively low molecular-weight group containing from about 2 to 4 carbon atoms may be cyclized under substantially more mild conditions. In fact, some of these substances are useful on oral administration as peripheral vasodilators or hypotensive agents in the same way as the isoquinolones of Formula VI due to conversion thereof into the isoquinolone in the intestinal tract. For example, kinetic studies employing 0.1N aqueous hydrochloric acid as cyclization medium and a temperature of 35°C., it was demonstrated that N-cyclopropyl-2-[2-[(3,4-dimethoxyphenyl)acetyl]-4,5-dimethoxyphenyl]acetamide exhibits a half life of about 5 hours in cyclization thereof to 2-cyclopropyl-6,7-dimethoxy-1-veratryl-3(2H)-isoquinolone. These reaction conditions are similar to those obtaining in the mammalian stomach.

DESCRIPTION OF SPECIFIC EMBODIMENTS

Generalized Ketoamide Procedure.- A solution of 1-(3,4-dialkoxybenzylidene)-6,7-dialkoxy-3-isochromanone in approximately 40 ml. of dry tetrahydrofuran per gram thereof is treated with an equimolar amount of the desired amine of formula $R^2R^3NH$ ($R^2$ and $R^3$ have the meaning given above) at 25°C. An arbitrary reaction period of overnight stirring is employed and the mixture is then concentrated in vacuo to a syrupy residue which crystallizes on treatment with ether. The preparation of a number of ketoamides produced by this method from 6,7-dimethoxy-1-(3,4-dimethoxyphenyl)-3-isochromanone and various amines is summarized in Table I. Each of the substances listed in Table I was purified by recrystallization from ethyl acetate.

Formula I $R^3 = H$

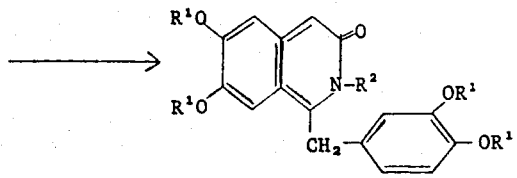

Formula VI

The acidic conditions involved in this transformation vary with the nature of the $R^2$ substituent. Refluxing 2N All melting points reported herein are corrected values measured according to USP XVII - Class I.

TABLE I

KETOAMIDE PREPARATIONS

| Example No. | Amine Reactant | Formula | % Yield | M.P. °C. | Analysis Found C | H | N |
|---|---|---|---|---|---|---|---|
| 1 | cyclohexylamine | I — $R^1$=$CH_3$, $R^2$=$CH(CH_2)_4CH_2$, $R^3$=H | 91 | 138.0–139.0 | 68.49 | 7.29 | 2.87 |
| 2 | allylamine | I — $R^1$=$CH_3$, $R^2$=$CH_2CH$=$CH_2$, $R^3$=H | 73 | 126.5–127.5 | 66.73 | 6.65 | 3.45 |
| 3 | p-anisidine | I — $R^1$=$CH_3$, $R^2$=p—$CH_3OC_6H_4$, $R^3$=H | 77 | 156.0–157.5 | 67.72 | 6.46 | 2.85 |
| 4 | hexamethylene-diamine | II — $R^1$=$CH_3$, $R^3$=H, n=6 | 45 | 138.0–144.5 | 66.41 | 6.93 | 3.40 |
| 5 | diethylamine | I — $R^1$=$CH_3$, $R^2$ and $R^3$ = $C_2H_5$ | 59 | 112.0–114.0 | 67.09 | 7.37 | 3.20 |
| 6 | cyclopropyl-amine | I — $R^1$=$CH_3$, $R^2$= ◁ , $R^3$=H | 95 | 156.0–158.0 | 66.97 | 6.78 | 3.19 |

4,5-Dimethoxy-2-[(3,4-dimethoxyphenyl)acetyl]-phenylacetic Acid.- 3,4-Dimethoxyphenylacetic acid (125 g., 0.637 mole) is added in one portion to 500 ml. of polyphosphoric acid at 75°C. The reaction mixture is then stirred for 15 min. and then poured into 4 l. of water. The mixture is allowed to stand overnight and the tacky brown solid precipitate is then collected, washed with water, and dried to yield 114 g. of the crude intermediate. Recrystallization of this material from ethyl acetate using decolorizing charcoal yields the desired keto acid, 69.3 g. (58%), m.p. 150°–153°C.

1-(3,4-Dimethoxybenzylidene)-6,7-dimethoxy-3-isochromanone.- 4,5-Dimethoxy-2-[2-(3,4-dimethoxyphenyl)acetyl]phenylacetic acid (10.0 g., 0.0267 mole) is mixed with 17 ml. of acetic anhydride and 17 ml. of glacial acetic acid containing 2 drops of concentrated sulfuric acid and heated on a steam bath for 4 hr. After standing at room temperature overnight, the crystalline product is collected on a filter, washed with ether, and air dried yielding 7.0 g. (74%) of the desired intermediate, m.p. 162°–165°C.

Example 7.

N-Butyl-2-[2-[3,4-dimethoxyphenyl)acetyl]-4,5-dimethoxyphenyl]acetamide.- A mixture of 18.7 g. (0.05 mole) of ketoacid (Formula IV, $R^1$=$CH_3$) and 5.0 g. (0.05 mole) of triethylamine in 350 ml. of tetrahydrofuran is stirred at —10°C. as 7 g (0.05 mole) of isobutyl chloroformate is added over 2 minutes. The mixture is kept at —10°C. for 20 minutes whereupon a yellow suspension appears. Additional triethylamine (10 g.) and 4.0 g. (0.055 mole) of n-butylamine are added all at once. The cooling bath is removed and the mixture is stirred at 25°C. for 2 hours after which the by-product triethylamine hydrochloride is filtered off and the filtrate concentrated (80°C./70 mm.). The residual amber syrup crystallizes upon standing under $Et_2O$ to give 7.5 g. of tan solid which is recrystallized twice from cyclohexane-ethyl acetate to give 4.0 (19%) of colorless crystals, m.p. 95.0°–96.5°C. (corr.).

Anal.: C, 67.38; H, 7.00; N, 3.24.

Conversion of ketoamides of Formula I $R^3$ = H into 2 $R^2$, 6,7-dialkoxy-1-(3,4-dialkoxybenzyl)-3(2H)-isoquinolones.- The following procedure is representative of the manner in which these substances may be converted into the isoquinolones referred to in the above identified co-pending patent application of the present inventors. N-Allyl-2-[2-[(3,4-dimethoxyphenyl)acetyl]-4,5-dimethoxyphenyl]acetamide, 0.5 g. (0.0012 mole) is boiled under reflux for 1 hr. in 20 ml. of 2.5N hydrogen chloride in ethanol. Evaporation of the solvent and recrytallization of the residue from ethanol-ethyl acetate yields 0.5 g. (99%) of bright yellow crystalline material identical with the product described in the above identified patent application. In applying of this procedure to other examples, the reflux period and concentration of hydrogen chloride may be varied as is necessary to afford optimum yield of the corresponding 3(2H)-isoquinolone.

The Generalized Procedure is applied to the reactants listed in Table II to prepare the ketoamides of Formulas I and II wherein $R^1$, $R^2$ or n, and $R^3$ have the meanings which are tabulated.

TABLE II

ADDITIONAL KETOAMIDES OF FORMULAS I AND II

| Ex. No. | Formula | $R^1$ | $R^2$ | $R^3$ | Reactants |
|---|---|---|---|---|---|
| 8 | I | $C_2H_5$ | ◁ | H | 1-(3,4-diethoxybenzylidene)-6,7-diethoxy-3-isochromanone and cyclopropylamine |
| 9 | I | $(CH_3)_2CH$ | ◁ | H | 1-(3,4-diisopropoxybenzylidene)-6,7-diisopropoxy-3-isochromanone and cyclopropylamine |
| 10 | I | n—$C_4H_9$ | ◁ | H | 1-(3,4-di-n-butoxybenzylidene)-6,7-di-n-butoxy-3-isochromanone and cyclopropylamine |
| 11 | II | $CH_3$ | n = 2 | $CH_3$ | 1-(3,4-dimethoxy)-6,7-dimethoxy-3-isochromanone and N,N′-dimethylenediamine |
| 12 | I | $CH_3$ | Cl—⟨phenyl⟩— | H | 1-(3,4-dimethoxy)-6,7-dimethoxy-3-isochromanone and p-chloroaniline |

TABLE II – Continued

ADDITIONAL KETOAMIDES OF FORMULAS I AND II

| Ex. No. | Formula | R¹ | R² | R³ | Reactants |
|---|---|---|---|---|---|
| 13 | I | CH₃ | (CH₃)₂CH | H | 1-(3,4-dimethoxy)-6,7-dimethoxy-3-isochromanone and isopropylamine |
| 14 | I | CH₃ |  | CH₃ | 1-(3,4-dimethoxy)-6,7-dimethoxy-3-isochromanone and N-methyl-aniline |
| 15 | I | CH₃ | 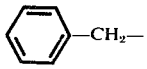 —CH₂— | H | 1-(3,4-dimethoxy)-6,7-dimethoxy-3-isochromanone and benzylamine |
| 16 | I | CH₃ | 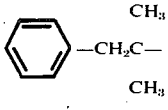 —CH₂C(CH₃)₂— | H | 1-(3,4-dimethoxy)-6,7-dimethoxy-3-isochromanone and phenyl-t-butylamine |
| 17 | I | CH₃ | Cl—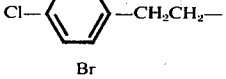—CH₂CH₂— | H | 1-(3,4-dimethoxy)-6,7-dimethoxy-3-isochromanone and 4-chlorophenethylamine |
| 18 | I | CH₃ | 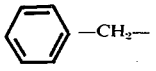 Br, —CH₂— | H 3- | 1-(3,4-dimethoxy)-6,7-dimethoxy-benzylamine |
| 19 | I | CH₃ | CH₃—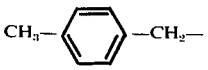—CH₂— | H | 1-(3,4-dimethoxy)-6,7-dimethoxy-3-isochromanone and 4-methyl-benzylamine |
| 20 | I | CH₃ | (CH₃)₂CH—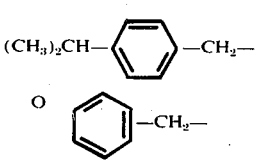—CH₂— | H | 1-(3,4-dimethoxy)-6,7-dimethoxy-3-isochromanone and 4-isopropyl-benzylamine |
| 21 | I | CH₃ |  O, O, —CH₂— | H | 1-(3,4-dimethoxy)-6,7-dimethoxy-3-isochromanone and 3,4-methylenedioxybenzylamine |
| 22 | I | CH₃ | 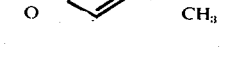 O, O, —CH₂CH(CH₃)— | H | 1-(3,4-dimethoxy)-6,7-dimethoxy-3-isochromanone and 1-(3,4-methylenedioxyphenyl)isopropylamine |
| 23 | I | CH₃ | CH₃O——CH₂— | H | 1-(3,4-dimethoxy)-6,7-dimethoxy-3-isochromanone and 4-methoxy-benzylamine |
| 24 | I | CH₃ | 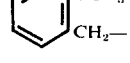 OCH₃, CH₂— | H | 1-(3,4-dimethoxy)-6,7-dimethoxy-3-isochromanone and 2-methoxy-benzylamine |
| 25 | I | CH₃ | (CH₃)₂CHO—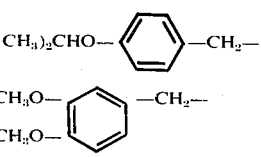—CH₂— | H | 1-(3,4-dimethoxy)-6,7-dimethoxy-3-isochromanone and 4-isopropoxy-benzylamine |
| 26 | I | CH₃ | CH₃O—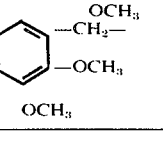(CH₃O—)—CH₂— OCH₃ | H | 1-(3,4-dimethoxy)-6,7-dimethoxy-3-isochromanone and 3,4,5-trimethoxybenzylamine |
| 27 | I | CH₃ |  —CH₂—, —OCH₃, OCH₃ | H | 1-(3,4-dimethoxy)-6,7-dimethoxy-3-isochromanone and 2,3- |

What is claimed is:

1. A compound selected from the group having Formulas I or II

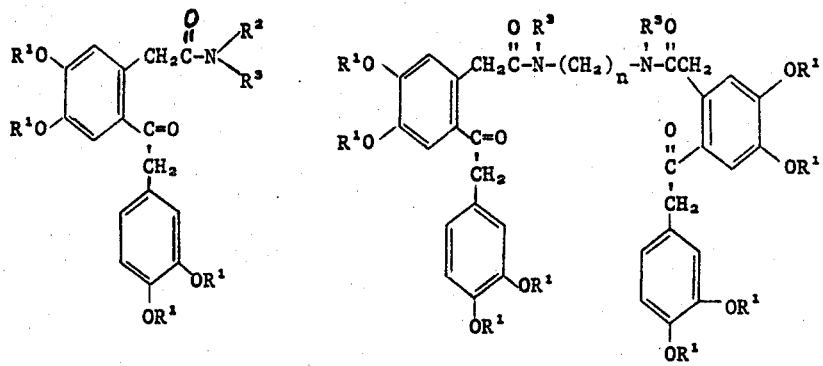

Formula I                Formula II wherein
- $R^1$ is lower alkyl having from 1 to 4 carbon atoms,
- $R^2$ is selected from the group consisting of lower alkyl having from 2 to 4 carbon atoms, alkenyl having from 3 to 6 carbon atoms, cycloalkyl having 3 to 6 carbon atoms, phenyl, phenylalkyl having up to 10 carbon atoms, substituted phenyl, and substituted phenylalkyl having up to 10 carbon atoms apart from the substituent, said substituent being in the 2, 3, 4, 5, or 6 ring positions and being selected from the group consisting of halogen, lower alkyl having up to 4 carbon atoms, methylenedioxy and from 1 to 3 lower alkoxy groups having up to 4 carbon atoms each,
- $R^3$ is selected from the group consisting of hydrogen and lower alkyl having from 1 to 4 carbon atoms, and
- $n$ is an integer of from 2 to 6.

2. A compound of claim 1 having Formula I wherein $R^3$ is hydrogen.

3. The compound of claim 1 identified as N-butyl-2-[2-[(3,4-dimethoxyphenyl)acetyl]-4,5-dimethoxyphenyl]acetamide.

4. The compound of claim 1 identified as N-cyclohexyl-2-[2-[(3,4-dimethoxyphenyl)acetyl]-4,5-dimethoxyphenyl]acetamide.

5. The compound of claim 1 identified as N-allyl-2-[2-[3,4-dimethoxyphenyl)acetyl]-4,5-dimethoxyphenyl]acetamide.

6. The compound of claim 1 identified as 2-[2-[(3,4-dimethoxyphenyl)acetyl]-4,5-dimethoxyphenyl]-N-(4-methoxyphenyl)acetamide.

7. The compound of claim 1 identified as N,N'-hexamethylenebis[2-[2-[(3,4-dimethoxyphenyl)acetyl]-4,5-dimethoxyphenyl]acetamide].

8. The compound of claim 1 identified as N,N-diethyl-2-[2-[(3,4-dimethoxyphenyl)acetyl]-4,5-dimethoxyphenyl]acetamide.

9. The compound of claim 1 identified as N-cyclopropyl-2-[2-[(3,4-dimethoxyphenyl)acetyl]-4,5-dimethoxyphenyl]acetamide.

* * * * *